United States Patent [19]

Kharas et al.

[11] Patent Number: 6,087,295
[45] Date of Patent: Jul. 11, 2000

[54] REDUCTION OF NO$_x$ IN THE EXHAUST GASES FROM INTERNAL COMBUSTION ENGINES CONTAINING EXCESS OXYGEN

[75] Inventors: Karl C. C. Kharas; Heinz J. Robota, both of Tulsa, Okla.

[73] Assignee: ASEC Manufacturing, Catoosa, Okla.

[21] Appl. No.: 09/107,673

[22] Filed: Jun. 30, 1998

Related U.S. Application Data

[63] Continuation-in-part of application No. 07/990,216, Dec. 14, 1992, Pat. No. 5,894,068.

[51] Int. Cl.$^7$ .............................. B01J 21/04; B01J 29/04; B01D 53/94
[52] U.S. Cl. ......................... 502/300; 502/302; 502/325; 502/345; 502/347; 502/352; 502/355; 423/213.5; 423/213.7
[58] Field of Search .............................. 423/213.5, 213.7; 502/300, 325, 345, 347, 352, 355, 302

[56] References Cited

U.S. PATENT DOCUMENTS

| | | | |
|---|---|---|---|
| 5,010,051 | 4/1991 | Rudy | 502/304 |
| 5,531,972 | 7/1996 | Rudy | 423/212 |
| 5,727,385 | 3/1998 | Hepburn | 60/297 |

FOREIGN PATENT DOCUMENTS

| | | | |
|---|---|---|---|
| 6-142512A | 5/1994 | Japan | 423/213.5 |
| 1384248 | 2/1975 | United Kingdom | 423/213.7 |

OTHER PUBLICATIONS

Kung et al. "Selective Reduction of NO$_x$ by Propene Over Au/γ–Al$_2$O$_3$ Catalysts" *11th International Congress on Catalysis—40th Anniversary* Studies in Surface Science and Catalysis, vol. 101, Elsevier Science B. V. J. W. Hightower et al. (Editors), pp. 701–710, Jun. 30–Jul. 5, 1996.

Haneda et al. "Ga$_2$O$_3$/Al$_2$O$_3$ Prepared by Sol–Gel Method . . . " *Chemistry Letters,* pp. 181–182, 1998 (No Month).

*Primary Examiner*—Steven P. Griffin
*Assistant Examiner*—Timothy C Vanoy
*Attorney, Agent, or Firm*—Kuffner & Associates

[57] ABSTRACT

Removal of carbon monoxide, hydrocarbons, and nitrogen oxides from the exhaust gas from lean-burn, diesel and other engines which produce exhaust gases containing excess oxygen is provided by a multi-component catalyst having at least two catalytic components, each capable of reducing nitrogen oxides within a range of exhaust gas temperatures that is different from the range of exhaust gas temperatures within which each other component is capable of reducing nitrogen oxides. Oxidation of the remaining reducing gases is also accomplished. One example of a two catalytic component catalyst of this invention has a first component of Au supported on alumina, which reduces nitrogen oxides at exhaust gas temperatures between about 600° C. and 900° C., and a second component of Pt supported on Y-zeolite, which reduces nitrogen oxides at exhaust gas temperatures below 600° C.; an example of a three catalytic component catalyst of this invention has a first component of CoO supported on γ-alumina, which reduces nitrogen oxides at exhaust gas temperatures above about 475° C., a second component of an alloy of Pt, Rh and Co supported on BaO$_2$-stabilized δ-alumina, which reduces nitrogen oxides at exhaust gas temperatures between about 315° C. and about 475° C. and a third component of an alloy of Pt and Rh supported on α-alumina, which reduces nitrogen oxides at exhaust gas temperatures between about 200° C. and about 425° C. A method of selecting such catalysts is also provided.

4 Claims, 11 Drawing Sheets

REDUCTION OF NO$_x$ IN THE EXHAUST GASES FROM INTERNAL COMBUSTION ENGINES CONTAINING EXCESS OXYGEN

This application is a continuation-in-part of application Ser. No. 07/990,216, filed Dec. 14, 1992, now U.S. Pat. No. 5,894,068.

BACKGROUND OF THE INVENTION

The invention relates generally to the control of hydrocarbons (HC), carbon monoxide (CO), and nitrogen oxides (NO$_x$) in the exhaust of internal combustion engines. More particularly, the invention relates to the removal of NO$_x$ when the exhaust gases include excess oxygen. This is typically the case with lean-burn engines, diesel engines, and other engines currently under development which are designed and produced to operate with amounts of oxygen beyond that needed for combustion of the fuel.

In recent years three-way catalysts have been used to remove all of the three principal noxious components in auto exhaust gases. The engines are run with stoichiometric air/fuel ratios and the catalysts are able to remove all three components at the same time, that is, a single catalyst is sufficient over the range of engine operating temperatures. More recently, development of so-called "lean-burn" engines is being driven by the desire to improve fuel economy. Such engines operate with air-fuel ratios which are far from the typical stoichiometric conditions. Instead of an air-fuel ratio of about 14.55/1 by weight, the lean-burn engine may operate with air-fuel ratios above 18/1, up to about 22–24/1, or even higher ratios for diesel engines. Under such conditions the engine exhaust may include less carbon monoxide, but will still contain excessive amounts of hydrocarbon and nitrogen oxides. Most catalysts are quite capable of converting hydrocarbons and carbon monoxide at such conditions, since the oxygen content is high, usually about 3–10% by volume. However, such conditions are not generally favorable for the reduction of nitrogen oxides. Much effort has gone into a search for catalysts that can effectively destroy nitrogen oxides under oxidizing conditions, but the results have not been satisfactory to date. Published information most pertinent to the present invention will be discussed below.

The use of base metals, particularly copper, ion-exchanged onto a zeolite support has been proposed by many workers in the art to be effective for reduction of nitrogen oxides. Others have suggested that such a catalyst should be combined with oxidation or three-way catalysts, usually in sequence. Toyota has proposed such arrangements in applications published in Japan. In JP Kokai 310742/1989 reference is made to earlier applications in which zeolites carrying transition metals are combined with downstream three-way or oxidation catalysts. These were said to be deficient and a catalyst was proposed which added noble metals to a copper-zeolite catalyst. Various methods of combining these materials are suggested. A related application is JP Kokai 127044/1989 in which an oxidation catalyst is deposited as a first layer, followed by a second layer of copper on a zeolite.

In EP 0488250A1 Toyota proposed three catalysts in series. Toyota discusses the use of various catalysts for removal of NO$_x$ from the exhaust of lean burn engines. Pt on zeolite is useful at low temperatures and Cu on zeolite at higher temperatures, but other catalysts are shown to be useful at inlet temperatures of about 300° C. These are the noble metals combined with the oxides of rare earth metals and metals from Group IVa of the Periodic Table (IUPAC), such as Ti, Zr, and Hf.

In EP 0494388A1 the applicants disclose two stages of catalysts for first removing nitrogen oxides and then oxidizing the remaining hydrocarbons and carbon monoxide. The NO$_x$ removal catalysts are defined as phosphates, sulfates, or aluminates of transition metals of the 4th period of the periodic table (e.g. Cr, Mn, Fe, Co, Ni, Cu, Zn). The oxidation catalyst is generally described as a noble metal, a base metal or a perovskite on a support.

There are two generally recognized routes to removing nitrogen oxides. First, the nitrogen oxides can be completely decomposed to produce diatomic nitrogen and diatomic oxygen. This reaction is thermodynamically favored, but is extremely slow. Moreover, catalysts which are able to promote this reaction under the highly oxidizing conditions and high temperatures found in typical automotive engine exhaust have not yet been found. The second route is the chemical reduction of nitrogen oxides using as reducing agents those gases already present in the exhaust, such as carbon monoxide, hydrocarbons, and hydrogen. This is considered to be the mechanism of the three-way catalyst. However, such catalysts were originally developed to interact with the exhaust from an engine operating at or about a stoichiometric air-fuel ratio, thus containing little or no excess oxygen. When a large excess of oxygen is present, as in a lean-burn or diesel engine, the oxygen tends to preferentially react with the hydrocarbons, carbon monoxide, and hydrogen, thus removing those reducing agents usually needed to remove nitrogen oxides. The present inventors have found that this problem can be overcome.

Those working in this field intend to either decompose nitrogen oxides into the elements directly or to reduce them using reducing agents under oxidizing conditions. The catalysts and catalyst systems of the present invention are considered to function by reducing the nitrogen oxides rather than decomposing them. However, that conclusion was reached based on experimental evidence and is not an essential aspect of this invention. The reaction mechanisms by which nitrogen oxides are reduced are believed to vary depending on the catalyst and the operating temperatures.

This invention is based, at least in part, on the discovery that catalysts which function to promote exhaust gas purification under appropriate operating conditions of a lean burn vehicle engine will behave in a limited temperature range within those operating conditions to selectively convert nitrogen oxides. This was surprising, as it is generally contrary to the experience with three-way catalysts--which become active ("light-off") at atemperature of about 250° to 350° C. and thereafter are able to oxidize hydrocarbons and carbon monoxide while reducing nitrogen oxides over the full range of operating temperatures, say about 300° to 800° C.

It should be noted here that the composition of auto exhaust and its temperature changes as driving conditions change. Consequently, tests of auto exhaust catalysts require that a car be operated over a range of conditions representing typical driving. Once three-way catalysts have reached operating temperature, the performance is not greatly affected by the exhaust gas temperature. This is not the case, however, with catalysts for engines operating in the lean-burn mode. It has been found that such catalysts are effective in removing nitrogen oxides only over a limited temperature range and outside of such range they are not effective. As will be appreciated, such a characteristic is not compatible with the usual variation in engine exhaust temperatures that occurs during typical driving conditions. We have found that by proper selection of catalysts it is possible to remove nitrogen oxides from exhaust gases containing excess oxygen at temperatures within the full operating range of about 170° C. to about 700° C.

Selection of catalysts for this difficult task requires consideration of the characteristics of each catalyst. It is believed that the chemical reactions differ with the catalyst composition and the temperatures of operation. Consequently, it has not been possible to find a single catalytic component capable of covering the full temperature range of lean-burn engine exhaust in the same manner as has been done with engines operating with stoichiometric air-fuel ratios. Based on the results of our experiments we believe that there exist certain catalysts that are not only capable of reducing nitrogen oxides within a specific particular temperature range but still remain very effective for oxidizing hydrocarbons and carbon monoxide at other temperatures. Thus, it appears that providing for both the reduction of nitrogen oxides and the oxidation of their reducing agents involves not only selection of the proper catalysts but the proper combination and positioning of catalysts in order to achieve the desired reduction of nitrogen oxides throughout the range of operating conditions of a lean burn engine.

SUMMARY OF THE INVENTION

It is a feature of the invention to provide a multicomponent catalyst capable of removing carbon monoxide, hydrocarbons, and nitrogen oxides from the exhaust gases produced by an engine that is operated with an excess of air relative to that required for stoichiometric combustion of the fuel, such as lean-burn, diesel, and the like. The catalyst comprises at least two catalytically active oxidation components, each component being additionally capable of reducing nitrogen oxides, but only effective at such $NO_x$ reduction within a particular narrower temperature range within that temperature range of catalytic activity for oxidation of the carbon monoxide and hydrocarbons, and each component being active to reduce $NO_x$ at a temperature range that is different from the other. In combination, the catalytic components are positioned with regard to one another such that they are able to reduce nitrogen oxides over the full range of engine operating temperatures. Additionally, by proper placement of the catalytic components, the catalyst will function effectively to oxidize carbon monoxide, hydrocarbons and hydrogen at the same time that the nitrogen oxides are being reduced. In particular, the catalytic components are placed so that the least active oxidation component is exposed to the exhaust gases first, followed by the next least active and so on, with the most active oxidation component being the last to be exposed to the exhaust gases.

In one embodiment, three catalytic components are separately made and individually placed in the following sequence to remove carbon monoxide, hydrocarbons and nitrogen oxides from the exhaust of lean-burn engines:

(a) a first catalytic component active to reduce nitrogen oxides at temperatures above the second and third components, for example from about 475° C. and up to about 800° C., with several acceptable first components identified herein, the preferred first component being cobalt atomically dispersed on gamma alumina;

(b) a second catalytic component active to reduce nitrogen oxides at temperatures within a range above the third component and below the first component, for example from about 315° C. and up to about 475° C., with several acceptable second components identified herein, the preferred second component being an alloy of platinum, rhodium, and cobalt dispersed on a barium oxide stabilized delta alumina; and (c) a third catalytic component active to reduce nitrogen oxides at temperatures below the range of the second component, for example from about 200° C. and up to about 425° C., with several acceptable third components identified herein, the preferred third component being an alloy of platinum and rhodium dispersed on an alpha alumina support.

In another embodiment of the invention, the three catalytic components are deposited on a single substrate in order of decreasing oxidative activity. That is, the third component, that component capable of reducing nitrogen oxides at temperatures from about 200° C. and up to about 425° C. as described above, is deposited on a substrate first. Then the second component is deposited on top of the third component followed, in turn, by deposition of the first component on top of the second component. In this embodiment the exhaust gas initially comes in contact with the least active oxidation component. The second catalytic component sees the exhaust gases only after the gases pass through the first component; in turn, the third catalytic component sees the exhaust gases only after they have passed through the second component.

Either of these embodiments may be employed in catalysts of this invention that comprise only two catalytic components. A two-component may be suitable in either of two situations:

a) those in which one or both components of a two-component system have broad active temperature ranges wherein the second component completes the desired exhaust gas treatment that the first component has started, and b) those comprising two-component multi-component catalysts in which one component displays the desired activity over two temperature ranges that straddle the active temperature range of the second component.

In another aspect, the invention is a method for reducing nitrogen oxides and oxidizing carbon monoxide and hydrocarbons in the exhaust from lean burn engines using the multicomponent catalysts described above.

It is yet another feature of this invention to provide a method for choosing catalytic components that may be combined to form a multi-component catalyst capable of removing carbon monoxide, hydrocarbons, and nitrogen oxides from the exhaust gases produced by an engine that is operated with an excess of air relative to that required for stoichiometric combustion of the fuel.

DESCRIPTION OF THE INVENTION

Figure 1:
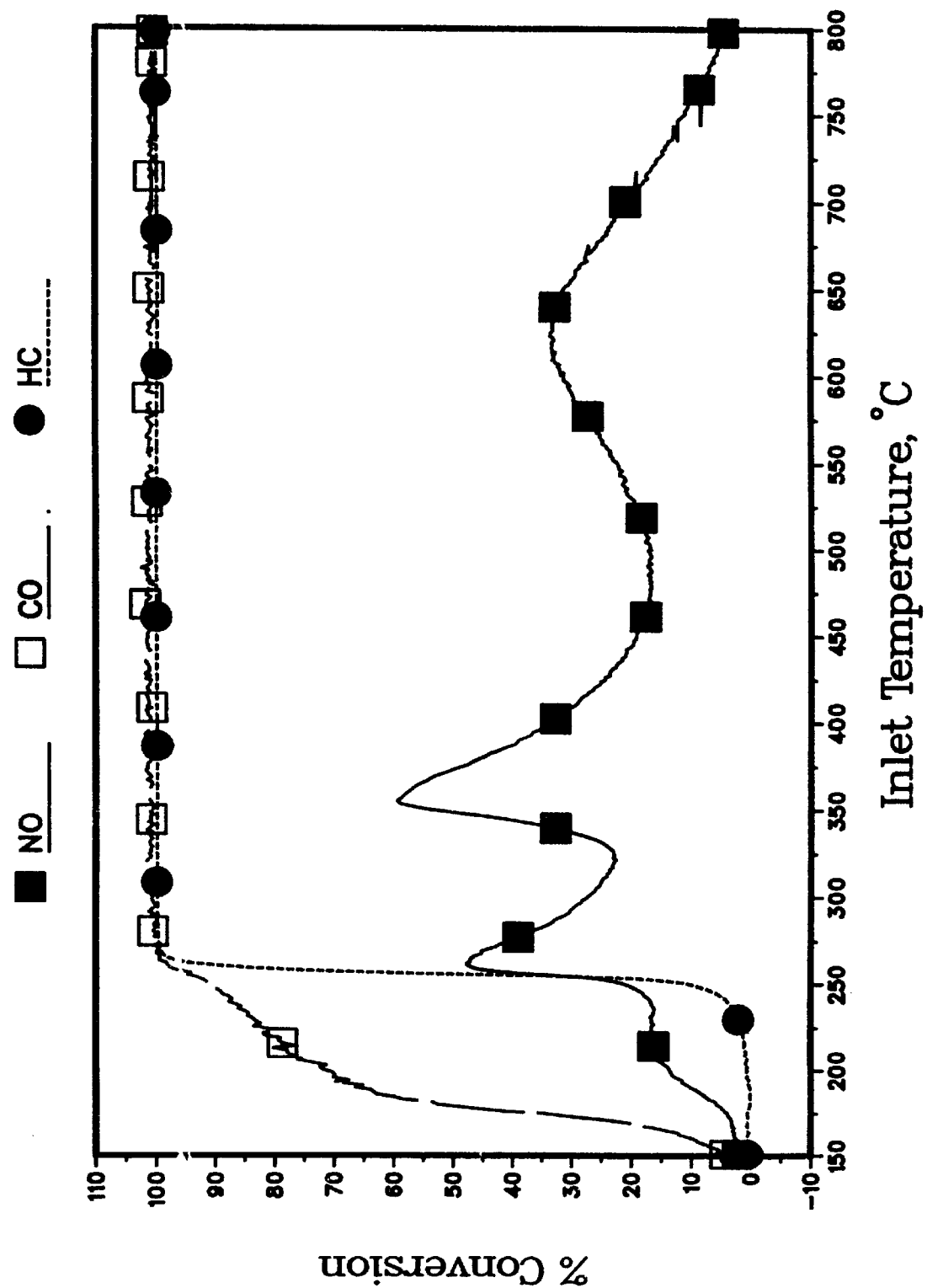
FIG. 1 is a plot of conversion of $NO_x$, HC, and CO versus temperature for a catalyst of the invention.

The invention comprises a multi-component catalyst consisting essentially of at least two catalytically active components each characterized in having activity to reduce nitrogen oxides within a particular temperature range that is different from the other(s) and being disposed physically so that the component being the least active as an oxidation catalyst is exposed to the exhaust gases first followed by the relatively more active component(s). Many multi-component catalysts of this invention will consist of three or more different catalytic components, each possessing activity in a different temperature range. In some cases, however, two components are sufficient. In addition to cases in which one or both components of a two-component system have broad active temperature ranges wherein the second component completes the desired exhaust gas treatment that the first component has started, two-component multi-component catalysts of this invention comprise those in which one component displays the desired activity over two temperature ranges that straddle the active temperature range of the second component.

First Catalytic Component

The first catalytic component in the sequence will receive exhaust gases immediately after they leave the engine. Consequently, the exhaust gases will be hotter and contain the highest concentrations of hydrocarbons, carbon monoxide, and nitrogen oxides. This first component should have the capability of reducing nitrogen oxides at such high temperatures, but should have relatively lower ability to oxidize residual hydrocarbons, hydrogen and carbon monoxide to $CO_2$ and $H_2O$, when compared to the other components. Such residual reducing agents can be cleaned up by the downstream catalytic components.

The temperature of engine exhaust gases may vary from 200° C. to 900° C. depending on the operating conditions. The first catalytic component therefore should be catalytically active at temperatures in the upper portion of the range, particularly above 600° C. When the temperatures are below that at which the first component is effective, the gases will pass with only minor changes to the second and third components, although at slightly lower temperatures since some heat will be lost.

Catalysts suitable to serve as the first catalytic component include:

Au supported on alumina, in particular those materials taught by Kung et al. reported in *Studies in Surface Science and Catalysis*, vol. 101, pages 701–710, 1997;

Pt/Au alloys and mixtures supported on alumina;

Oxidized Cu supported on alumina;

Oxidized Ag supported on alumina, particularly those catalysts wherein the silver oxide comprises crystallites or clusters highly dispersed on an alumina having high surface area, such as γ-alumina or η-alumina, and wherein the catalyst is snow-white in color;

$Ga_2O_3$ supported on alumina, such as those materials contemplated by Haneda et al. reported in *Chemistry Letters*, pages 181–182, 1998;

$In_2O_3$ supported on alumina comprising between about 0.5 wt. % and about 20 wt. % In prepared either by impregnation of an indium salt onto a high-surface-area alumina, such as one of the transitional phases (e.g., γ, η, δ, or θ) or by the sol-gel process known to those skilled in the art;

Dispersed $SnO_2$ supported on alumina comprising between about 1 wt. % and about 20 wt. % $SnO_2$ and a high-surface-area alumina, such as one of the transitional phases (e.g., γ, η, δ, or θ), preferably an alumina having a surface area greater than 75 $m^2/gm$.;

Cu and Ag supported on zeolite, particularly a composition wherein said zeolite is crystalline and has a Si/Al atomic ratio between about 5 and about 100, a pore size between about 0.5 nm and about 1.3 nm, essentially no octahedral aluminum detectable by $^{27}Al$ NMR spectroscopy and a sodium ion exchange capacity, with regard total aluminum content, greater than 75%, and wherein the copper content is between about 0.5 wt. % and about 12 wt. % and the silver content is between about 0.25 wt. % and about 20 wt. %;

Pt supported on a mixture of alumina and an aluminosilicate in the proton form possessing the MFI structure and a Si/Al mole ratio of 19 (in two-component systems only—see discussion on two-component catalysts below); and CoO supported on γ-alumina.

CoO Supported on γ-alumina

Of the many acceptable first catalytic components, cobalt oxide deposited on a gamma alumina support is preferred. This catalyst has been found to be effective for reduction of nitrogen oxides and oxidation of hydrocarbons at temperatures above about 475° C. Below that temperature, only a small effect is seen. Consequently, it will be appreciated that this catalyst is particularly suited for the role allotted to the first catalytic component.

Similar catalysts have been disclosed by Hamada et al., Applied Catalysis, 1991, 75, L1–L8 who impregnated alumina with solutions of cobalt compounds, followed by drying and calcining. They reported that the ability of the catalyst to reduce NO to $N_2$ was strongly affected by the source of the cobalt and that the performance of alumina alone was significant. The temperature of calcination was suggested to be a factor and it was speculated that formation of cobalt aluminate species was involved in the improved performance found with higher temperature calcination of cobalt acetate on γ-alumina. The authors postulated that $NO_2$ was formed by oxidation of NO followed by reduction with an oxygenated species of propane.

The cobalt content of the preferred first catalytic component may be from about 4 to 35%, preferably 7 to 14%, by weight of the catalytic component. We believe that the catalyst performance is enhanced by preparations that provide atomically dispersed cobalt oxide. Various methods for preparation may be used, such as those discussed by Bai et al., J. Solid State Chem. 91, 148,152 (1991). However, it should be noted that the study by Bai et al. had no relation to the present use for CoO on γ-alumina catalysts. Various precursor compounds were used to impregnate gamma alumina, and the impregnated support then dried at 230° C. and finally heat treated at 450° C. In particular, we prefer to use an aqueous solution of cobalt acetate and adjust the pH to 2.4 with acetic acid prior to the impregnation of γ-alumina. More broadly, other cobalt compounds such as cobalt (II) carbonate could be used. However, the pH of the solution must still be adjusted to between about 2 and 4 by addition of an acid such as citric acid, tartaric acid, glycolic acid, lactic acid, malic acid, or the like prior to impregnation.

The alumina should be a gamma alumina since it has been found that other types of alumina provide poorer performance with regard to the reduction of nitrogen oxides. However, gamma alumina is gradually converted to other crystalline phases when exposed to high temperatures. Consequently, the presence of some of the higher forms of alumina is not excluded.

Second Catalytic Component

The second catalytic component of this invention will come in contact with the exhaust gases after they have been exposed to the first component. At that time, if the operating conditions for the first component were within its range of selective activity, that is, for the preferred CoO/γ-alumina above about 475 0°C., a significant amount of nitrogen oxides and hydrocarbons in the exhaust will have been substantially destroyed. If the first catalytic component doesn't precisely match the initial operating temperatures, there may have been a lesser amount of conversion. In such case, the second catalytic component, which is most effective in the operating range above about 315° C. and generally below about 475° C., will provide the principal catalytic activity. Conversely, when the first catalytic component is within its operating range the second component acts as a "back up" to further reduce the amount of the hydrocarbons and carbon monoxide which remain.

Suitable second catalytic components are those having good intermediate temperature light-off characteristics with high selectively for $NO_x$ reduction at temperatures near light-off. Examples of such materials include Pt/Ag alloys and/or mixtures supported on alumina, Rh supported on molecular sieves and, when the multi-component catalyst comprises two components, Pt supported on a Y-zeolite (see discussion on two-component catalysts below). The preferred second catalytic component for three-component systems, however, has at least two unique features. First, it employs a new support, which is a barium-stabilized delta alumina. Second, it combines noble metals, particularly platinum and rhodium with cobalt in an alloyed form, which will be seen to provide advantages relative to the comparable non-alloyed metals.

The support for the preferred second catalytic component is prepared by a sol-gel procedure which produces a very stable delta alumina and, although it contains a substantial amount of barium, appears to be solely alumina when examined by x-ray diffraction. Suitable procedures for the preparation of this support are disclosed in U.S. Pat. No. 5,389,589, which is incorporated herein by reference.

Another feature of the preferred second catalytic component is the use of alloyed noble metals from Group VIII. Heretofore, it has been thought that alloying was detrimental to catalyst performance. See, for example, J. T. Kummer, J. Phys. Chem. 1986, 90, 4747–4752. Also, sintering of the noble metal crystallites has been seen in aged auto catalysts, suggesting that loss of activity is associated with sintering of the noble metals. Typical three-way catalysts used with engines operated with a stoichiom etric air/fuel ratio are prepared by impregnating supports with noble metal solutions and heating to temperatures of about 450 to 700° C. This process does and is intended to decompose the noble metal compounds and leave the metals as separate crystallites on the support. In the present catalyst, which is for use with engines operated under oxidizing conditions, it has been found that alloying the noble metals provides highly durable catalysts with a preference for reduction of nitrogen oxides. Alloying of the noble metals may be done by various methods. One preferred method of alloying is to hydrothermally treat the impregnated support in an atmosphere containing 3 to 30% steam, preferably about 10% steam (remainder an inert gas such as nitrogen) at temperatures of about 600° to 1200° C. until the alloying is completed. Since the support is also produced by a process which uses a high temperature treatment to convert the alumina into a stable delta alumina, it is feasible to use such a process to alloy the noble metals.

The noble metals of Group VIII include Pt, Pd, Rh, Ru, Os, and Ir. Generally, only Pt, Pd, and Rh are used in automobile exhaust catalysts. For the second catalytic component of this invention, Pt and Rh are preferred in atomic proportions of 5/1 to 30/1, although Pd could be included if desired. In addition, the second catalysts may contain a minor amount of cobalt, or another a base metal selected from Ni and Fe, and metals of Groups IVa and IVb such as Sn, Ce, Ti, and Pb. The noble metals will be about 0.01 to 5.0 g/L, preferably 0.7 to 3.6 g/L, most preferably 1.0 to 2.5 g/L, if disposed on a monolithic carrier. The cobalt or other base metal, if present, will be about 0.01 to 3.0 g/L, preferably 0.1 to 1.0 g/L, most preferably 0.2 to 0.5 g/L, if disposed on a monolithic carrier.

Addition of the noble metals may be done by impregnation techniques familiar to those skilled in the art or deposition of colloidal alloys onto the support material. Generally, these procedures involve contacting the support with an aqueous solution of the metal (or metals) compound to be deposited and subsequently drying and heating the impregnated support to decompose the metal compounds. The concentration of the metal compounds in solution will be adjusted to provide the amount of metals in the finished catalyst. Suitable noble metal compounds include the halogenated compounds (e.g. chloro platinic acid, rhodium chloride), nitrates (e.g. rhodium nitrates), acetates (e.g. rhodium acetate), and for platinum the sulfite acid (hydroxy disulfite platinum II acid). Preferred noble metal compounds include rhodium nitrate, rhodium sulfite, rhodium oxalate, platinum oxalate and platinum sulfite.

The base metal cobalt is preferably applied by impregnation of the support with an aqueous solution of a cobalt compound, such as cobalt II nitrate, although others such as cobalt acetate and cobalt oxalate may also be used. The choice of base metal compounds will be determined by their kinetic ability to alloy with platinum.

Third Catalytic Component

The third catalytic component is a very active catalyst capable of oxidizing hydrocarbons and carbon monoxide under lean-burn conditions at temperatures as low as 150° C. and of reducing nitrogen oxides in the window between about 200° C. and 425° C. This component has the lowest temperature "window" of the three. It will reduce nitrogen oxides principally during the period after initial engine start and any other conditions where the exhaust gases are relatively cold, such as during extended engine idle or low speed cruising. It is placed in the third position not only because the exhaust gases are the coldest there, but because if located upstream of the first or second catalytic components it would remove practically all the reducing agents necessary for the first and second components to operate effectively to convert nitrogen oxides when the gas temperatures are higher. That would render the first or second catalytic component ineffective even at those temperatures at which they should be operating to reduce nitrogen oxides and the third catalyst is not able to do so.

It is a unique feature of the preferred third catalytic component that it is disposed on or near the surface of an alpha alumina support. Such materials are known to have a low surface area and would ordinarily be avoided in formulating auto exhaust catalysts. However, it has been discovered that the higher surface area aluminas, such as the γ-aluminas tend to have undesirable interactions with rhodium in auto exhaust catalysts under oxidizing conditions. The surface loading of the noble metals may be accomplished by impregnation techniques familiar to those skilled in the art.

The noble metals of Group VIII will be Pt, Pd, and/or Rh, preferably Pt and Rh in atomic proportions of 5/1 to 30/1. the total noble metal content being about 0.01 to 5.0 g/L, preferably 0.7 to 3.6 g/L, most preferably 1.0 to 2.5 g/L, when disposed on a monolithic carrier.

The methods of producing such catalysts may be similar to those discussed above in connection with the second catalytic component. Typically, the noble metals will be impregnated onto the alpha alumina s upport such that they remain at or near the surface. After drying and optionally calcining, the catalysts will be given a hydrothermal treatment at high temperature to alloy the noble metals. Again, it may be noted that since the support is stable at high temperatures, the use of very high temperatures to alloy the noble metals is feasible.

Two-Component Catalysts

Two-Component catalysts of the present invention comprise both those in which the second component completes the desired exhaust gas treatment that the first component has started and those in which one component displays the desired activity over two temperature ranges that straddle the active temperature range of the second component.

The former class comprises a first component from the list of catalysts suitable as the first catalytic component above, excluding CoO supported on γ-alumina and Pt supported on Y-zeolite, and a second component comprising Pt supported on Y-zeolite.

A suitable catalytic component combination for the latter class (i.e., the straddle class) combines two different Pt supported on Y-zeolite catalysts. In this embodiment, the first component comprises Pt on a mixture of alumina and an aluminosilicate possessing the MFI structure and the second component comprises dealuminated Y-zeolite crystals in the proton form having diameters within a range of 0.5 μm. to 50 μm. and having between about 0.1 wt. % and about 2 wt. % Pt dispersed thereon in a manner such that at least 90% of the Pt is located within 500 Å of the exterior surface of the crystals. In this embodiment, the first catalytic component displays active temperature ranges that straddle the active temperature range of the second component.

Either of the aforementioned Pt supported on zeolite catalytic components are also suitable as third components in a three-component system.

Disposition of the Catalytic Components

The three catalytic componentsjust described may be placed in sequence by several methods. The most obvious method would be to place such catalysts in separate containers, and then position them in sequence, with the first catalytic component closest to the engine exhaust. The supported catalytic components typically would be disposed on a ceramic or metallic monolith of the type commonly used in current commercial practice. Alternatively, non porous pellets could be substituted for the monoliths. Although the catalysts have been described as being disposed on supports, in order to place them on non-porous carriers it may be preferred to wash-coat the supports first onto the carrier, that is, with γ-alumina for the first catalyst, BaO-δ-alumina for the second catalyst, and α-alumina for the third catalyst, and thereafter deposit the active catalytic metals on the wash-coated carrier.

Alternative methods suggest themselves. For example, a single unit would be made by placing the catalytic components in sequence on a single monolith or by packing pelleted catalytic components in sequence into a single container. Such methods would be less expensive but might provide less flexibility in disposition of the catalysts.

Method for Choosing Catalytic Components to Form a Multi-component Catalyst

Figure 5:
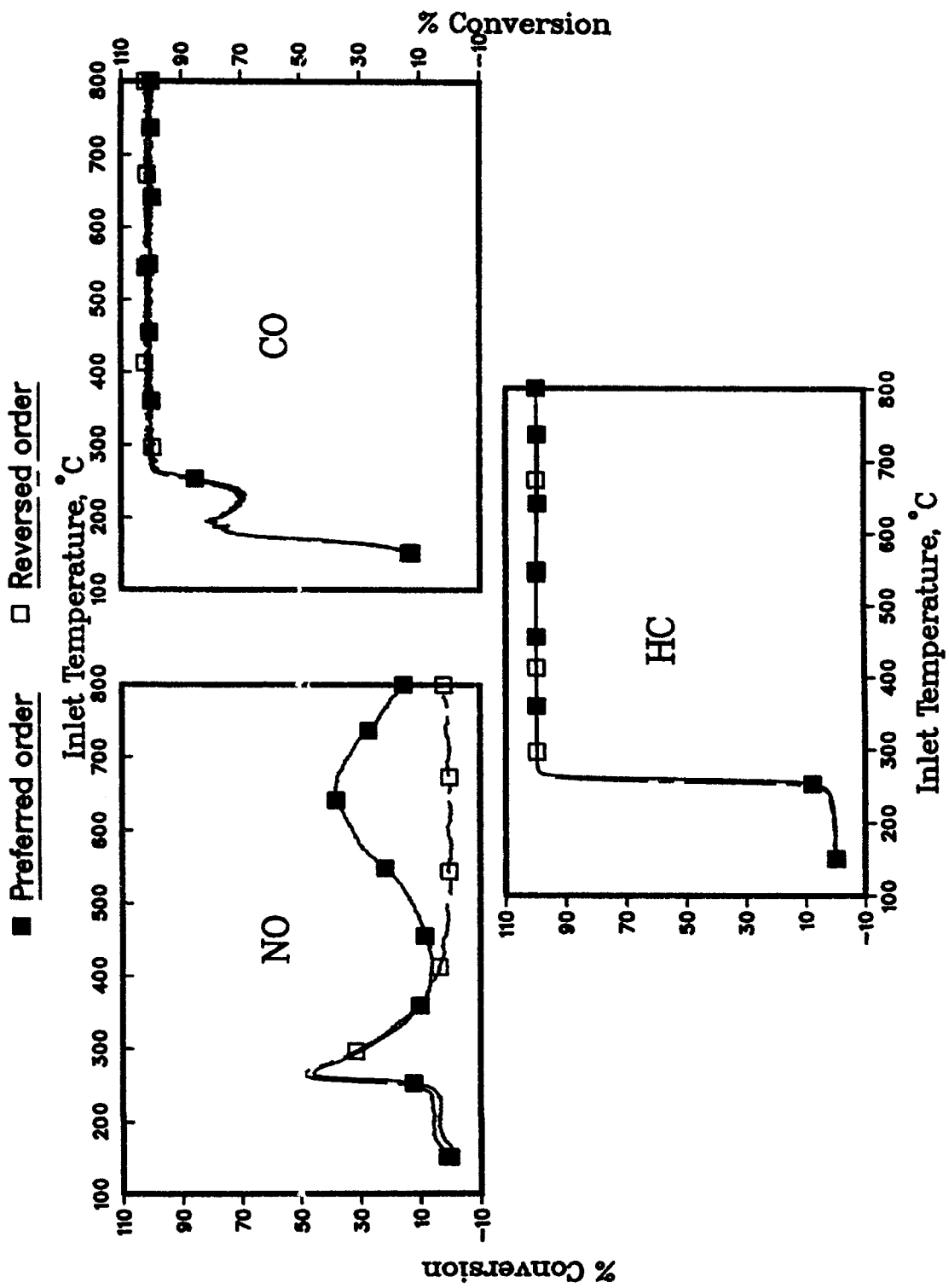
FIG. 5 is a plot of conversion of $NO_x$, HC, and CO versus temperature for the first and third catalytic components of the invention in the preferred and reversed order.

As previously discussed, the order in which the catalytic components are placed is important. This is illustrated in FIG. 5 in which the performance of the preferred first and third catalytic components is shown. It will be seen that, if the first catalytic component ($CoO$-$\gamma Al_2O_3$) is downstream ofthe third catalytic component ($Pt,Rh$-$\alpha$-$Al_2O_3$), there will be no reduction of nitrogen oxides at temperatures above about 425° C.

One method for choosing suitable components and their order of placement in a multi-component catalyst employs the following twelve-step procedure:

1. Determine the $NO_x$ and hydrocarbon conversions of candidate catalytic components as a function of temperature.
2. Eliminate all candidate components that do not catalyze selective reduction of $NO_x$ using hydrocarbons as reducing agents in oxidizing catalysts.
3. Eliminate all candidate components surviving step 2 that do not catalyze oxidation of hydrocarbons under oxidizing conditions.
4. Propose one or more multi-component catalyst(s) suitable for the desired exhaust gas treatment by selecting and arranging their order of assembly from the candidate components surviving step 3.
5. For each of the proposed multi-component catalysts from step 4, construct mathematical functions for each component that is the $NO_x$ conversion of that component's $NO_x$ conversion as a function of temperature.
6. For each of the proposed multi-component catalysts from step 4, construct a mathematical function that is the maximum $NO_x$ conversion of that multi-component catalyst's candidate components' $NO_x$ conversions as a function of temperature.
7. Using the functions from step 6, define each proposed multi-component catalyst's $NO_x$ reduction window as the range of temperature between the lowest and highest temperature that $NO_x$ conversion is greater than zero.
8. Eliminate those candidate multi-component catalysts for which the mean value of each of the functions constructed in step 6 for its reduction window determined in step 7 is not greater than the greatest mean value of the corresponding components' set of mean values of the functions constructed in step 5 for the same reduction window.
9. For each candidate multi-component catalyst surviving step 8, designate its component proposed for operation at the highest temperature range as component #1, the component proposed for operation at the next highest temperature range as component #2 and so on through the component for operation at the lowest temperature range, designated component #n.
10. For each candidate multi-component catalyst surviving step 8 and using the component designations from step 9, construct a series of n-1 functions of hydrocarbon conversion vs. temperature where the hydrocarbon conversion of component #1 is the first function in the series, the sum (limited to 100%) of the hydrocarbon conversions of components #1 and #2 is the second function in the series, and the sum (limited to 100%) of the hydrocarbon conversions of components #1, #2, . . . , and #n−1 is the n−1 function in the series.

11. Eliminate all candidate multi-component catalysts surviving step 8 for which the temperature range for $NO_x$ reduction by component #n does not occur at a temperature range where the hydrocarbon conversion of the n-1 function determined in step 10 is more than essentially zero, the temperature range for $NO_x$ reduction by component #n-1 does not occur at a temperature range where the hydrocarbon conversion of the n-2 function is more than essentially zero, . . . , and the temperature range for $NO_x$ reduction by component #2 does not occur at a temperature range where the hydrocarbon conversion of the first function is more than essentially zero.

12. Multi-component catalysts of this invention suitable for the desired exhaust gas treatment are those candidates surviving step 11.

EXAMPLE 1
Preparation of the Preferred First Catalytic Component

An atomically dispersed 8 wt. % CoO on γ-alumina catalyst was prepared by the following process:

18.4 g cobalt (II) acetate hydrate was dissolved in 450 g deionized water. 450 grams of glacial acetic acid was added, which produced a pH of 2.7. The product was then transferred to a rotary steam evaporator and 50 g of 20–40 mesh γ-$Al_2O_3$ (made by calcining LaRoche Forming Grade boehmite) was added. The resulting mixture was then evaporated to dryness over a 3-hour period.

The dried material was calcined for 2 hours at 150° C. and then at 600° for 6 hours.

EXAMPLE 2
Preparation of BaO-δ-$Al_2O_3$ Support 250 mL of a boeh nite sol (VISTA Chemical Dispal 11N7-12) was placed in a 4000 mL beaker. 15.82 g barium acetate was dissolved in 10.3 mL of deionized water. The boehmite sol was stirred and the barium acetate solution along with 40.5 g of polyethylene glycol (Sigma PEG3265) were added simultaneously, producing a gel. The gel was transferred to an evaporating dish and dried in an oven at 120° C. The dried gel was then calcined at 1000° C. for 6 hours. A pure δ-alumina was the result, with no evidence of separate barium-containing phases.

EXAMPLE 3
Preparation of the Preferred Second Catalytic Component 9.45 g of platinum. sulfite acid solution (2.55 wt. % Pt), 2.44 g of rhodium nitrate solution (0.50 wt. % Rh), and 0.036 g of cobalt (ll) nitrate hexahydrate were dissolved in 170 g of deionized water. The solution was brought into contact with 18 g of the BaO-δ-$Al_3O_3$ support prepared as in Example 2A. The resulting impregnated support was dried at 100° C. for 3 hours and then calcined at 600° C. for 6 hours. The calcined catalyst was hydrothermally treated at a temperature of about 1140° C. for 6 hours in an atmosphere of nitrogen containing about 10% steam to alloy the noble metals.

EXAMPLE 4
Preparation of the Preferred Third Catalytic Component

A. 15.8 g. of platinum sulfite acid solution (1.71 wt. % Pt) and 2.68 g. of rhodium nitrate solution (0.50 wt. % Rh) were dissolved in 45 g of deionized water. The solution was brought intc contact with 20 g of α-alumina made by calcining at 1350° C. for 9 hours a commercial γ-alumina supplied by UOP. The resulting impregnated support was dried at 100° C. for 3 hours. The calcined catalyst was hydrothermally treated at a temperature of about 1194° C. for 6 hours in an atmosphere of nitrogen containing about 10% steam to alloy the noble metals.

B. The preparation described above (A) was repeated except that 0.034 g. of cobalt acetate tetrahydrate was dissolved in the platinum-rhodium solution so that the resulting catalyst contained cobalt in addition to the noble metals.

EXAMPLE 5

Figure 2:
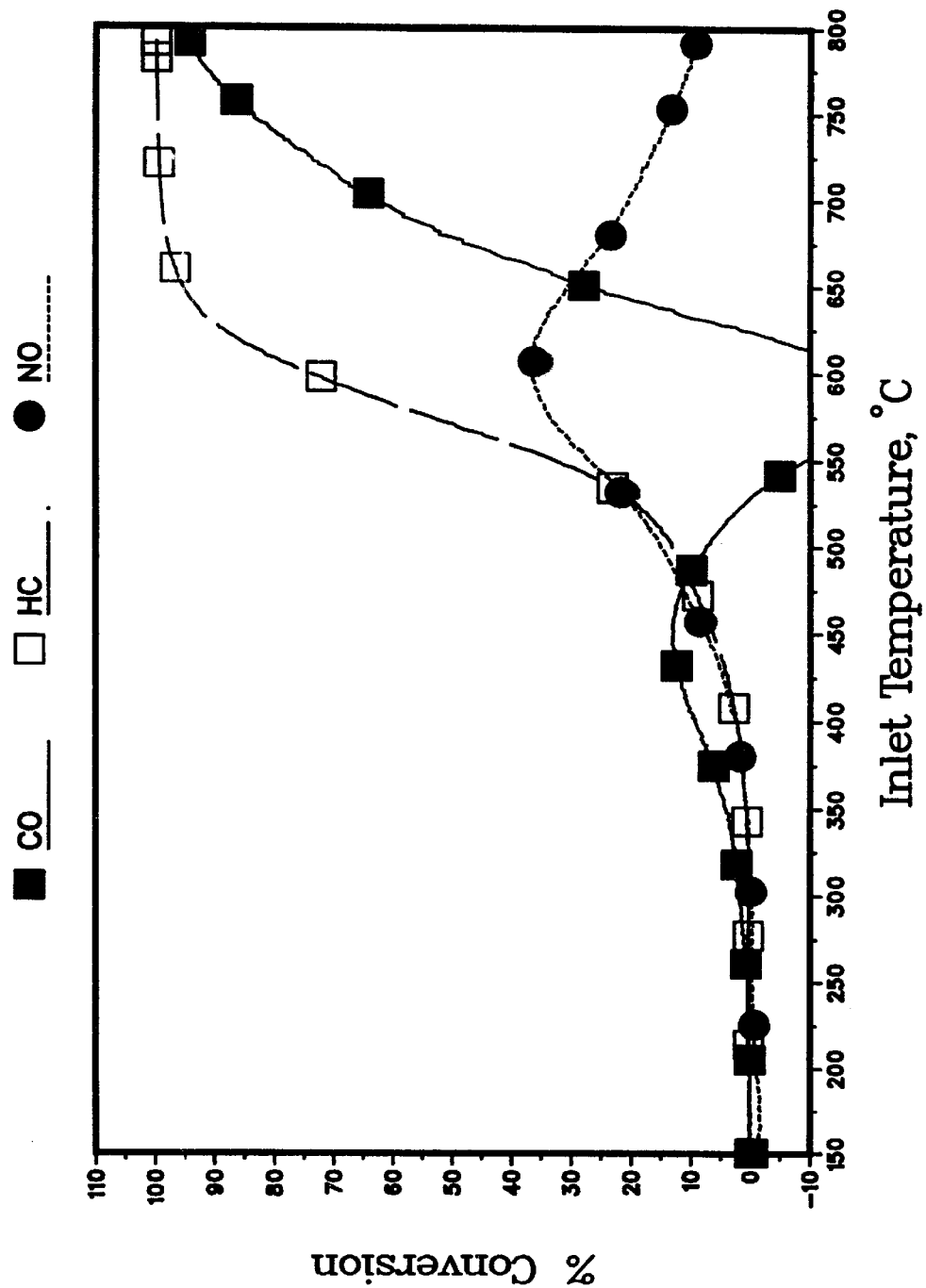
FIG. 2 is a plot of conversion of $NO_x$, HC, and CO versus temperature for a first catalytic component of the invention.
Figure 3:
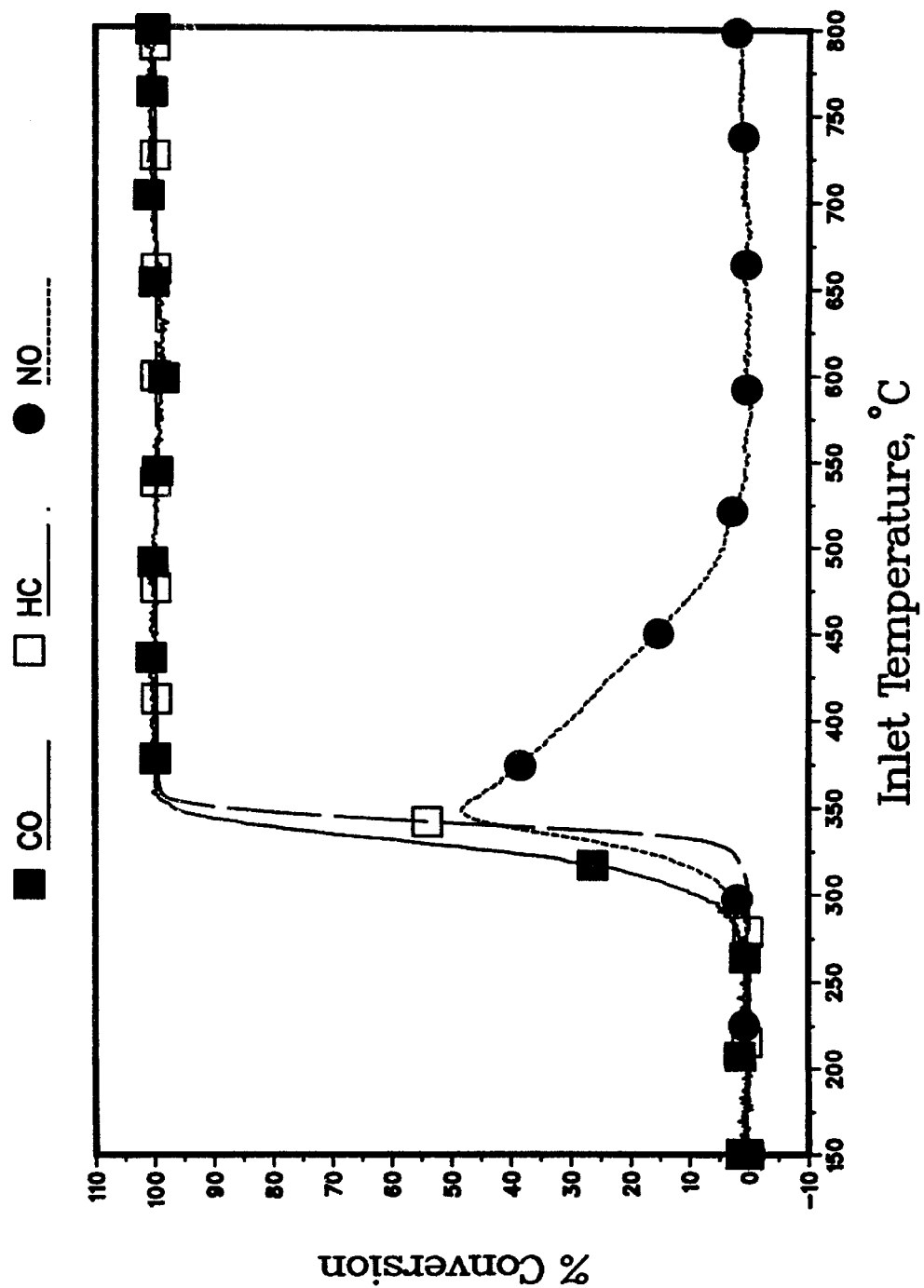
FIG. 3 is a plot of conversion of $NO_x$, HC, and CO versus temperature for a second catalytic component of the invention.
Figure 4:
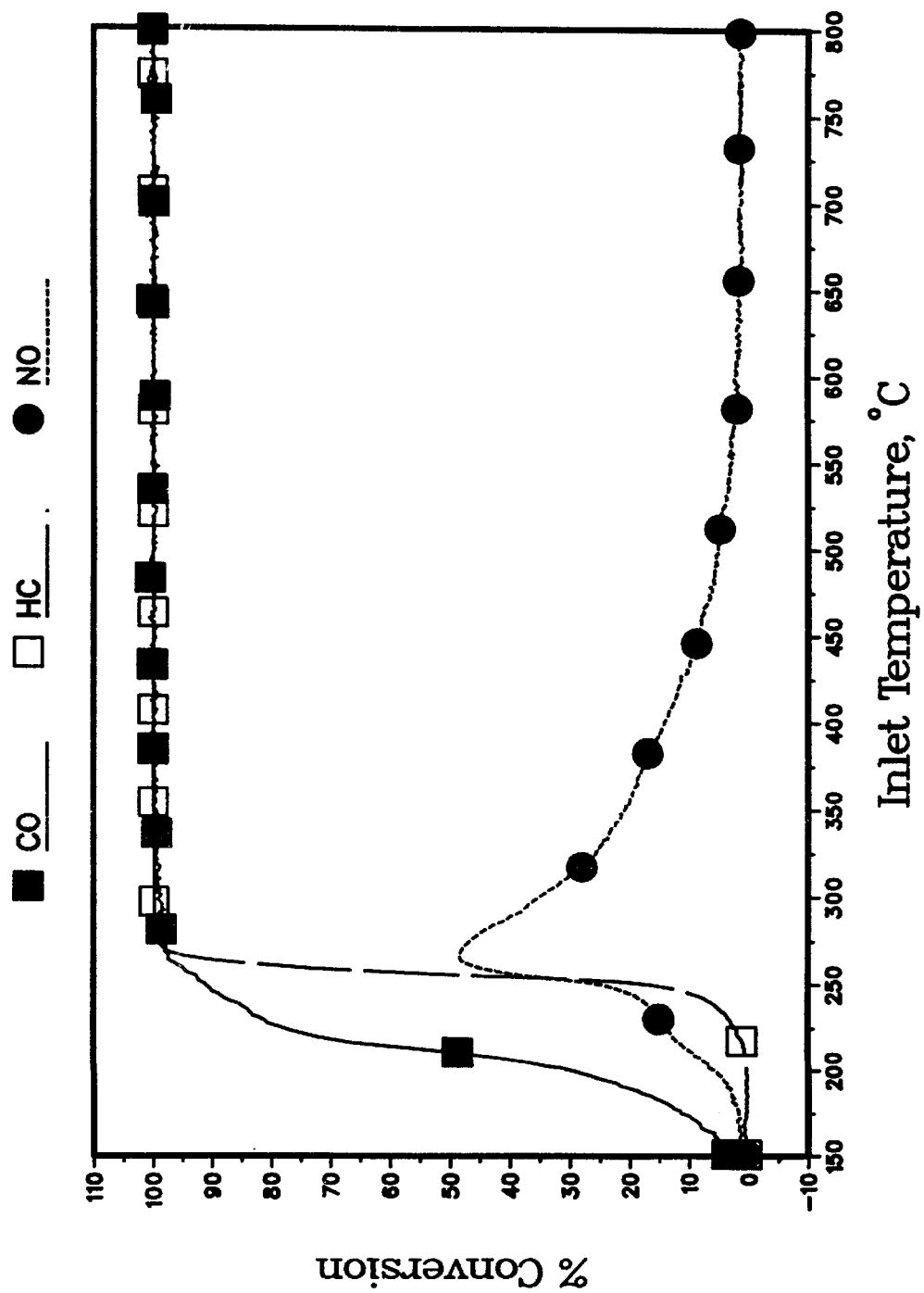
FIG. 4 is a plot of conversion of $NO_x$, HC, and CO versus temperature for a third catalytic component of the invention.

The three catalytic components prepared as described above were formed into pellets and placed in sequence in a single bed as follows. 1 g CoO on γ-$Al_2O_3$ (Example 1) at the reactor inlet, then 1 g Pt,Rh,Co on BaO-δ-$Al_2O_3$ (Example 3) and 1 g Pt,Rh on γ-$Al_2O_3$ (Example 4A) at the reactor outlet. The sequential catalysts were tested by exposure to a synthetic exhaust gas containing 1200 ppm $NO_x$, 3000 ppm CO, 1000 ppm $H_2$, 1600 ppm HC (hydrocarbon), and 3.2 vol. % $O_2$, remainder nitrogen and 10 vol. % steam. The temperature was gradually increased up to a maximum of 800° C. (rise 1) and then reduced to 50° C. and repeated (rise 2). The performance of the catalyst is shown in FIG. 1 for rise 1. It can be seen that the conversion of $NO_x$ begins at a low temperature and appears related to the conversion of CO at first and then conversion of HC. The conversion of $NO_x$ is maintained at about 30% until about 700° C. it begins to drop. Since the normal operating temperature range for automobiles only occasionally exceeds 650° C., the removal of $NO_x$ is possible under most conditions. The operating temperatures of the individual catalysts tested in a similar manner are shown in FIGS. 2–4. It will be seen that as separate catalysts, each component has limited ability to cover the full range of exhaust gas temperatures. However, by procedures well within the skill of the art, a composite of all three components will provide nitrogen oxide conversion for the entire range from about 250° C. to about 800° C. The best overall composite catalyst was found to be a 1.5:1:2 ratio of Pt, Rh, Co alloy on α-$Al_2O_3$, Pt, Rh, Co on barium oxide stabilized δ(delta) $Al_2O_3$ and CoO on γ(gamma) $Al_2O_3$.

EXAMPLE 6

In the preferred order, 1 gram of CoO on γ-$Al_2O_3$ (Example 1) was placed at the reactor inlet and 3 grams of Pt,Rh,Co on α-$Al_2O_3$ (Example 4B) was placed at the reactor outlet. The catalysts were tested according to the manner of Example 5; results are shown in FIG. 5. Contribution for NO reduction by both catalysts can be discerned from the Figure. In the reversed order, 3 grams of Pt,Rh,Co on α-$Al_2O_3$ was placed at the reactor inlet and 1 gram of CoO on γ-$Al_2O_3$ was placed at the reactor outlet. The catalyst was also tested according to the manner of Example 5 and the results are shown in FIG. 5. Although NO reduction catalyzed by the Pt,Rh,Co on α-$Al_2O_3$ component can be discerned to have occurred between about 200° C. and 425° C., NO reduction by the CoO on γ-$Al_2O_3$ did not occur. Thus, it can be seen that the catalysts must be in the order required by the invention.

EXAMPLE 7
Preparation of a Catalytic Component having Pt Supported on a Mixture of Alumina and an Aluminosilicate in the Proton form Possessing the MFI Structure and a Si/Al Mole Ratio of 19

An aluminosilicate possessing the MFI structure and a Si/Al ratio of 19, in the proton form, was suspended in deionized water and a platinum sulfite solution was added. One gram of Pt, as the element, was added for every 70 grams of zeolite. The specific gravity of the suspension was about 1.2. After stirring the suspension for two hours, sufficient tetramethylammonium hydroxide solution was added to raise the suspension's pH to 7. Then a milled suspension of Condea SCFA-90 alumina, consisting predominately of θ-alumina with a median particle diameter of about 5 μm, was added in an amount of 15 grams of alumina per 100 grams of zeolite. The resulting suspension was stirred for over two hours and then coated onto 1.8 liter cordierite monoliths having a cell density of 62 cells/cm.$^2$ (400 cells/in.$^2$) using a method known to those skilled in the art. The dry loading of catalyst washcoat into the monolith was about 140 grams/liter and the Pt loading was 1.77 grams/liter.

EXAMPLE 8
Preparation of a Catalytic Component of Dealuminated Y-zeolite Crystals in the Proton Form having Diameters within a Range of 0.5 μm. to 50 μm. and having Between About 0.1 wt. % and about 2 wt. % Pt Dispersed Thereon in a Manner such that at Least 90% of the Pt is Located within 500 Å of the Exterior Surface of the Crystals A sample of catalyst was prepared using the procedure of Example 7 except that the zeolite used was a dealuminated Y-zeolite, in the proton form, possessing a thin superficial alumina film on the zeolite crystals. The Pt loading on the resulting catalyst was 2.5 grams/liter.

EXAMPLE 9

A quantity of γ-alumina was made by calcining Vista Dispal 23N4-80 boehmite (lot no. 6A-T04514J) at 150° C. for 2 hours and then at 600° C. for 6 hours. 1500 grams of the γ-alumina were placed in a rotary steam evaporator. Then 48.21 grams of $AgNO_3$ were dissolved in 1000 grams of deionized water and sprayed on the γ-alumina. The alumina was dried overnight in the steam evaporator, calcined in air at 150° C. for 2 hours and then at 600° C. for 6 hours. About 150 grams of the resulting material were milled in a high-speed mill for 5 minutes. The resultant slurry was calcined in air at 150° C. for 2 hours and then at 600° C. for 6 hours and sized to 20–40 mesh. The resulting catalyst was examined and found to be snow white in color.

EXAMPLE 10
Preparation of Cu and Ag Supported on Zeolite Catalyst

A copper-silver zeolite catalyst was prepared by dissolving 3.32 grams of cupric acetate hydride and 2.83 grams of silver nitrate into 1 liter of deionized water and a 20 grams of ZSM-5 material provided by Conteka (CBV 5020, ID No 130-90-002, Si/Al atom ratio 25.5) was added. After stirring overnight, the pH was raised to 7.50 using aqueous ammonia and held there for two hours. After filtering, drying, and calcination at 400° C. for about 4 hours, the catalyst was divided into granules between 420 μ and 850 μ in size using wire screens. The copper and silver ion exchange contents on the resulting catalyst were 348% and 82%, respectively, and the ratios of copper and silver atoms to aluminum atoms were 1.74 and 0.82, respectively.

EXAMPLE 11
This Example Applies the Method of the Present Invention for Choosing Suitable Components and their Order of Placement in a Multi-component Catalyst In this application of the method of this invention described above as a twelve-step procedure under Method for Choosing Catytic Components to Form a Multi-component Catalyst, the proposed multi-component catalyst comprises three components: the first catalytic component is oxidized Ag supported on alumina catalyst (hereafter designated "$Ag/Al_2O_3$"), the second catalytic component is Pt/Rh alloy supported on α-alumina (hereafter designated "$Pt/Rh/\alpha-Al_2O_3$"), and the third component is Pt supported on ZSM-5 (hereafter designated "Pt-ZSM-5"). Having determined that these catalysts selectively reduce $NO_x$ using hydrocarbons as reducing agents, this example follows said twelve-step procedure beginning at step 3.

Figure 6:
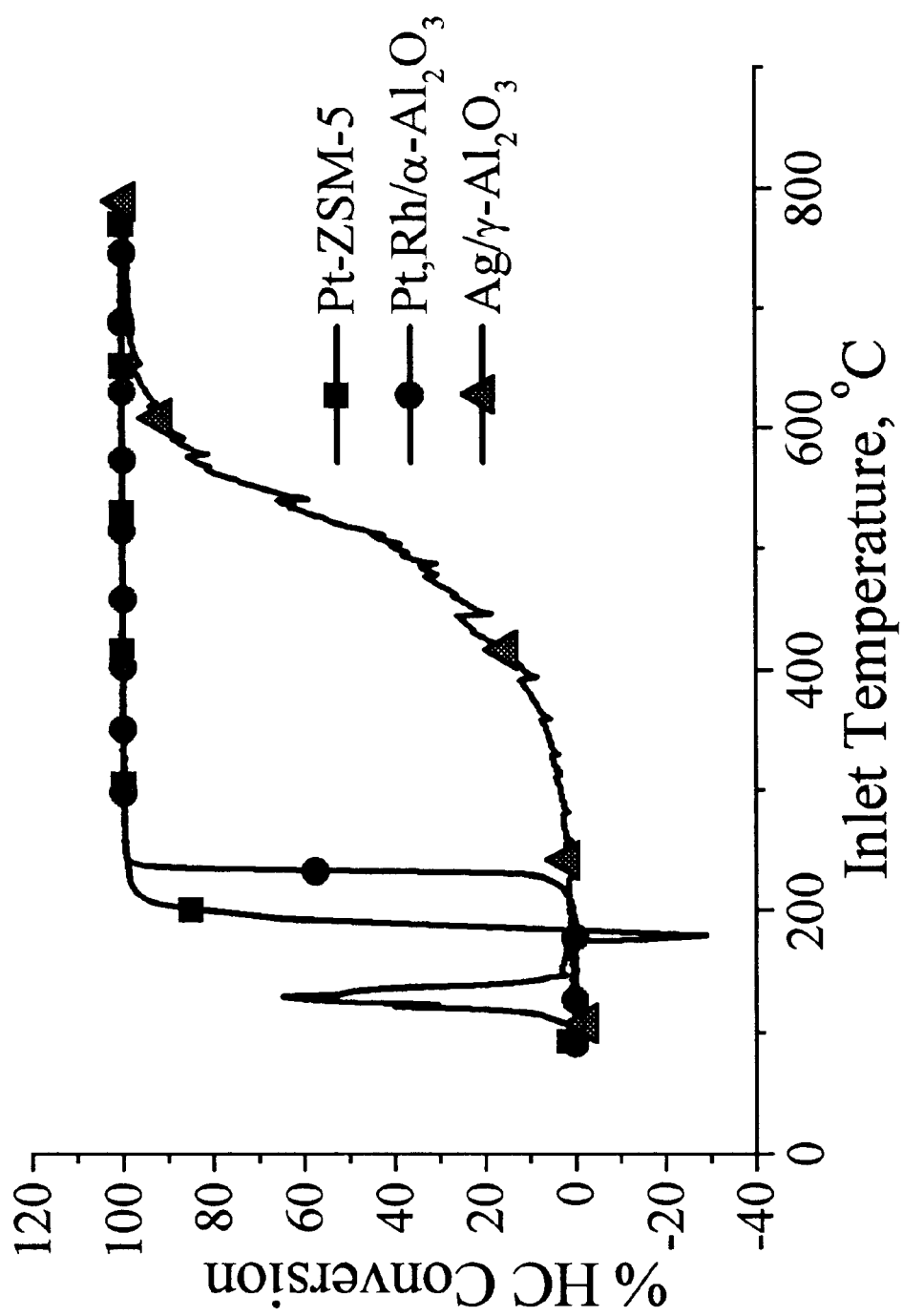
FIG. 6 is a plot of hydrocarbon conversion versus temperature for the three catalytic components comprising the multi-component catalyst used in Example 11 to illustrate the method of selecting multi-component catalysts of this invention.
Figure 7:
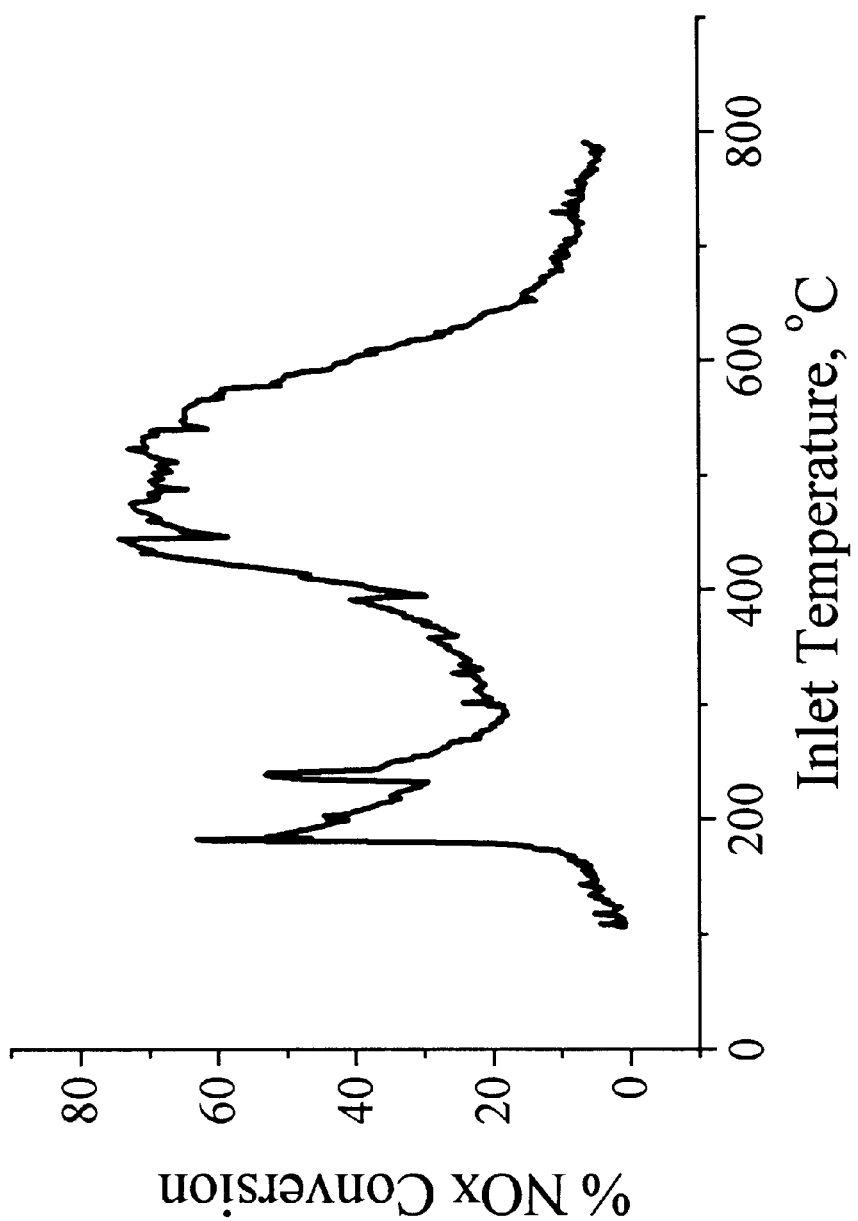
FIG. 7 is a plot illustrating step 6 of Example 11.
Figure 8:
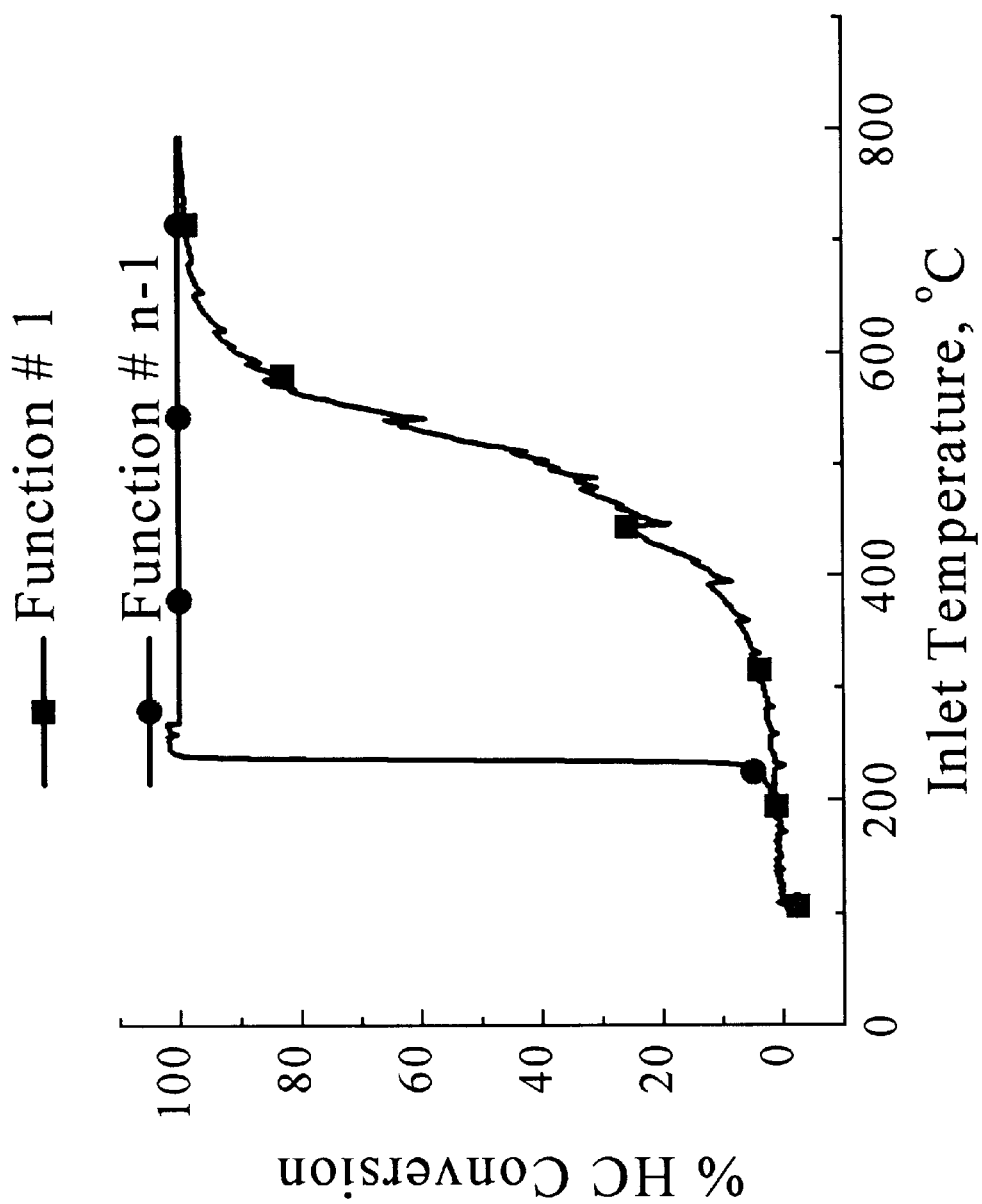
FIG. 8 is a plot illustrating step 10 of Example 11.
Figure 9:
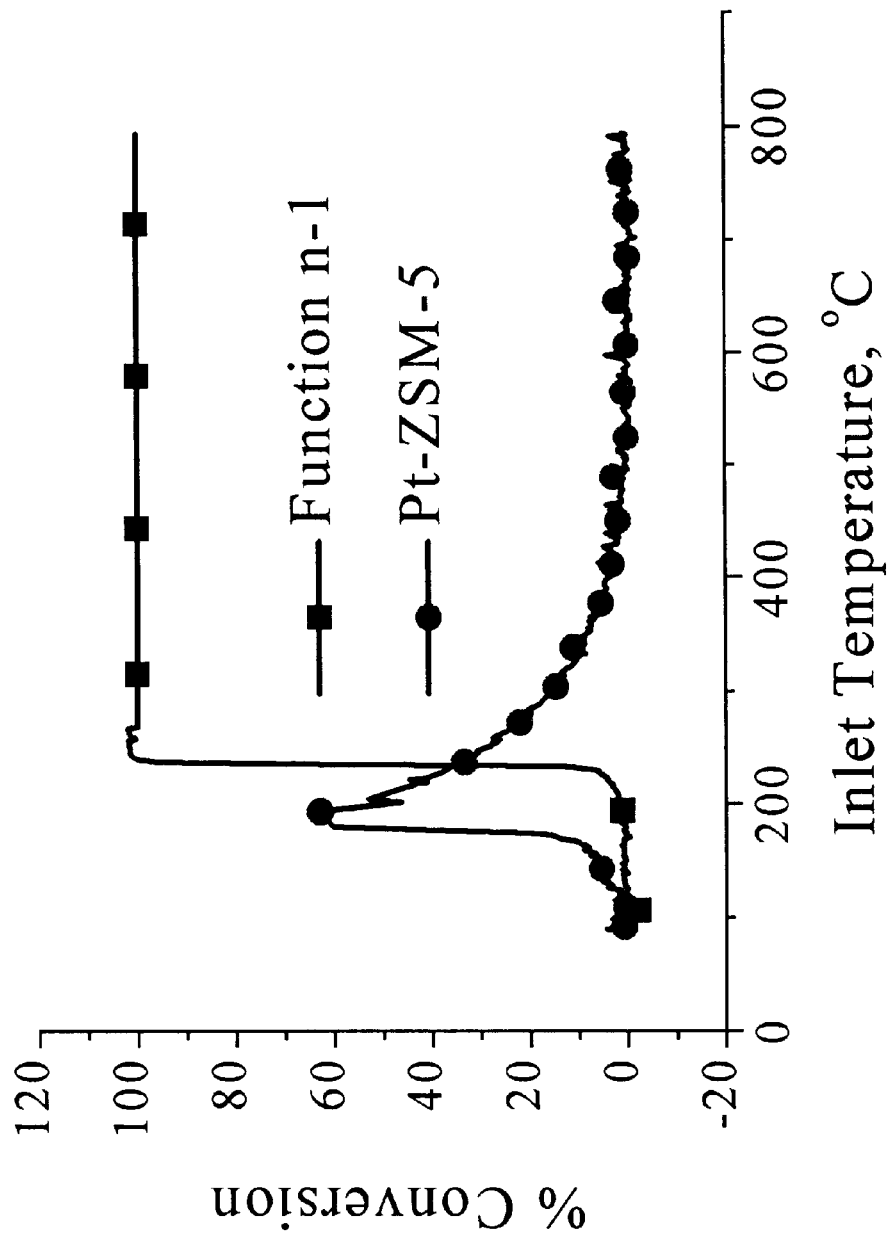
FIGS. 9 and 10 are plots illustrating step 11 of Example 11.
Figure 10:
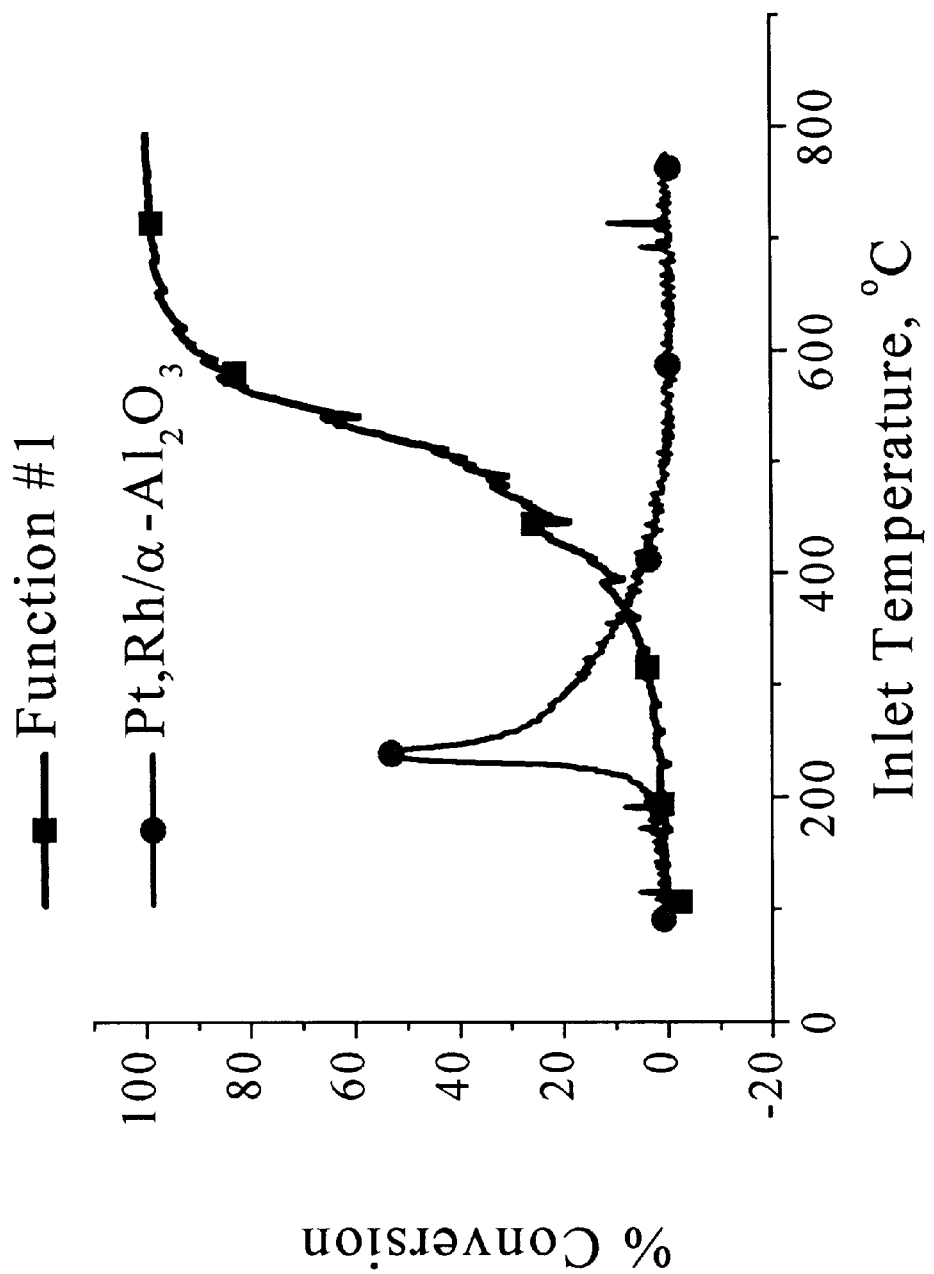
Figure 11:
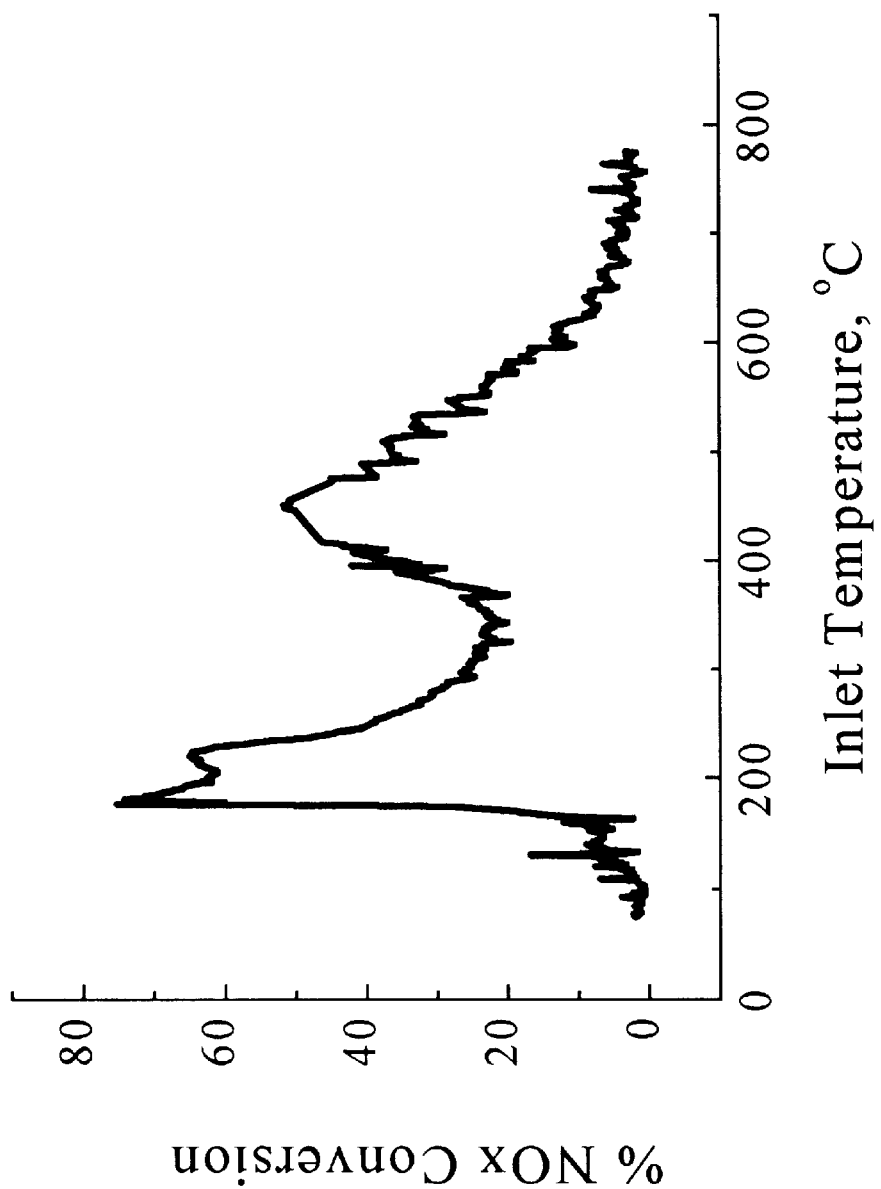
FIG. 11 is a plot illustrating step 12 of Example 11.

3. It is verified that each of these materials catalyze hydrocarbon oxidation. Curves showing their hydrocarbon conversion vs. temperature are shown in FIG. 6.
4. The propsed multi-component catalyst is that described in the second paragraph of this Example 11.
5. The functions of the components' $NO_x$ conversions versus temperature required by step 5 of the twelve-step procedure under Method for Choosing Catalytic Components to Form a Multi-component Catalyst are omitted for brevity.
6. The mathematical function of step 6 of the said twelve step procedure is generated. This function is shown in FIG. 7.
7. The $NO_x$ reduction window from FIG. 7 is from about 190° C. to about 625° C.
8. The mean $NO_x$ reduction for the function of FIG. 7 is 32.7%. The mean $NO_x$ reduction over the same reduction window for the $Ag/Al_2O_3$ is 28.7%, for the $Pt/Rh/\alpha-Al_2O_3$ is 5.81% and for the Pt-ZSM-5 is 9.02%. Hence, the proposed combination is suitable.
9. The components are designated to correspond to the ordinal positions described in the second paragraph of this Example 11; i.e., the composition described therein as "the first component" is designated component #1, etc.
10. For this proposed combination of three catalytic components, n=3. The two functions needed are the hydrocarbon conversion of the $Ag/Al_2O_3$ and the hydrocarbon conversion of the sum of the $Ag/Al_2O_3$ and the $Pt/Rh/\alpha-Al_2O_3$, limited to 100%. These two functions are shown in FIG. 8.
11. The Pt-ZSM-5 (component #n in this three-component system) has its temperature range for $NO_x$ reduction mostly below about 200° C. where function #n−1 from step 8 shows hydrocarbon conversion of essentially zero. This is shown in FIG. 9. Similarly, the $Pt/Rh/\alpha-Al_2O_3$ (component #2 in this three-component system) mostly below about 350° C. where function #1 from step 8 shows hydrocarbon conversion of essentially zero, as shown in FIG. 10.
12. The suitability of the proposed multi-component catalyst is shown its performance in reducing $NO_x$ in exhaust gas from a lean-burn engine over a wide temperature range, as shown in FIG. 11.

What is claimed is:

1. A multi-component catalyst for removing carbon monoxide, hydrocarbons, and nitrogen oxides contained in exhaust gases from a lean-burn internal combustion engine, said engine operating with an air-fuel ratio above about 18, comprising:
   (a) a first catalytic component comprising a catalyst selected from the group consisting of:
      (i) alumina having dispersed thereon a catalytically effective amount of a material selected from the group consisting of Pt/Au alloys and mixtures, oxidized Cu, oxidized Ag, $Ga_2O_3$, $In_2O_3$, and dispersed $SnO_2$;
      (ii) zeolite having dispersed thereon a catalytically effective amount of Cu and Ag; and,
      (iii) γ-alumina having dispersed thereon a catalytically effective amount of CoO;
   (b) a second catalytic component comprising a catalyst selected from the group consisting of alumina having dispersed thereon a catalytically effective amount of Pt/Ag alloys and/or mixtures and molecular sieves having dispersed thereon a catalytically effective amount of Rh; and (c) a third catalytic component comprising a catalytically effective amount of Pt dispersed on a support selected from the group consisting of α-alumina and Y-zeolite.

2. A multi-component catalyst for removing carbon monoxide, hydrocarbons, and nitrogen oxides contained in exhaust gases from a lean-burn internal combustion engine, said engine operating with an air-fuel ratio above about 18, comprising:

a first catalytic component comprising a catalytically effective amount of Pt dispersed on a mixture of alumina and aluminosilicate, said aluminosilicate being in the proton form, possessing the MFI structure and having a Si/Al mole ratio of 19; and a second catalytic component comprising a catalytically effective amount of Pt dispersed on dealuminated Y-zeolite crystals, said crystals being in the proton form and having diameters within a range of 0.5 μm. to 50 μm., wherein the Pt is dispersed on the crystals in a manner such that at least 90% of the Pt is located within 500 Å of the exterior surface of the crystals.

3. A multi-component catalyst for removing carbon monoxide, hydrocarbons, and nitrogen oxides contained in exhaust gases from a lean-burn internal combustion engine, said engine operating with an air-fuel ratio above about 18, comprising:

a first catalytic component comprising a catalyst selected from the group consisting of:
  (i) alumina having dispersed thereon a catalytically effective amount of a material selected from the group consisting of Pt/Au alloys and mixtures, oxidized Cu, oxidized Ag, $Ga_2O_3$, $In_2O_3$, and dispersed $SnO_2$; and,
  (ii) zeolite having dispersed thereon a catalytically effective amount of Cu and Ag; and a second catalytic component comprising a catalyst selected from the group consisting of:
  (i) a catalytically effective amount of Pt dispersed on alumina and an aluminosilicate, said aluminosilicate being in the proton form, possessing the MFI structure and having a Si/Al mole ratio of 19; and
  (ii) a catalytically effective amount of Pt dispersed on dealuminated Y-zeolite crystals, said crystals being in the proton form and having diameters within a range of 0.5 μm. to 50 μm., wherein the Pt is dispersed on the crystals in a manner such that at least 90% of the Pt is located within 500 Å of the exterior surface of the crystals.

4. A multi-component catalyst for removing carbon monoxide, hydrocarbons, and nitrogen oxides contained in exhaust gases from a lean-burn internal combustion engine, said engine operating with an air-fuel ratio above about 18, comprising:

a first catalytic component comprising a catalytically effective amount of Pt dispersed on a mixture of alumina and aluminosilicate, said aluminosilicate being in the proton form, possessing the MFI structure and having a Si/Al mole ratio of 19; and a second catalytic component comprising a catalytically effective amount of Pt dispersed on dealuminated Y-zeolite crystals, said crystals being in the proton form and having diameters within a range of 0.5 μm. to 50 μm., wherein the Pt is dispersed on the crystals in a manner such that at least 90% of the Pt is located within 500 Å of the exterior surface of the crystals.

* * * * *